(12) United States Patent
Pae

(10) Patent No.: US 9,338,602 B2
(45) Date of Patent: May 10, 2016

(54) METHOD FOR PROVIDING LOCATION-BASED SERVICE FOR FINDING PERSON USING SMART DEVICE

(71) Applicant: Jin Woo Pae, Seongnam-si (KR)

(72) Inventor: Jin Woo Pae, Seongnam-si (KR)

(*) Notice: Subject to any disclaimer, the term of this patent is extended or adjusted under 35 U.S.C. 154(b) by 8 days.

(21) Appl. No.: 14/353,673

(22) PCT Filed: Oct. 24, 2012

(86) PCT No.: PCT/KR2012/008729
§ 371 (c)(1),
(2) Date: Apr. 23, 2014

(87) PCT Pub. No.: WO2013/062291
PCT Pub. Date: May 2, 2013

(65) Prior Publication Data
US 2014/0295892 A1     Oct. 2, 2014

(30) Foreign Application Priority Data
Oct. 24, 2011   (KR) ........................ 10-2011-0109027

(51) Int. Cl.
*H04W 24/00*   (2009.01)
*H04W 4/02*    (2009.01)
*G06Q 30/02*   (2012.01)
*G06Q 30/08*   (2012.01)
*H04W 4/20*    (2009.01)

(52) U.S. Cl.
CPC ........... *H04W 4/023* (2013.01); *G06Q 30/0261* (2013.01); *G06Q 30/08* (2013.01); *H04W 4/206* (2013.01)

(58) Field of Classification Search
USPC ...................................... 455/456.3
See application file for complete search history.

(56) References Cited

U.S. PATENT DOCUMENTS

2007/0135138 A1*   6/2007   Brown et al. .............. 455/456.3

FOREIGN PATENT DOCUMENTS

KR   10-2003-0044970 A    6/2003
KR   10-2005-0107671 A   11/2005
KR   10-2007-0042044 A    4/2007

* cited by examiner

*Primary Examiner* — Joel Ajayi
(74) *Attorney, Agent, or Firm* — Jefferson IP Law, LLP

(57) ABSTRACT

According to a method for providing a location-based service for finding a person using a smart device suggested in the present invention, the method can find a second user corresponding to matching information among other users at adjacent places in real time and can enable a first user to be connected with a person who he or she looks for by chance by enabling a service provision server to receive the location information from a first user terminal, to match the second user using the matching information received and registered from the first user terminal among other users located within the predetermined distance from the location of the first user, and to transmit the matched data to the first user terminal.

7 Claims, 7 Drawing Sheets

METHOD FOR PROVIDING LOCATION-BASED SERVICE FOR FINDING PERSON USING SMART DEVICE

TECHNICAL FIELD

The present invention relates, in general, to a method for providing a service for finding a person and, more particularly, to a method for providing a location-based service for finding a person using a smart device.

BACKGROUND ART

Generally, as the internet has recently become popular, information sharing beyond time and space has been realized, and accordingly, attempts to find someone and make more personal connections using the internet and the like have gradually increased. Until now, a method of finding someone using internet sites has been carried out in such a way as to form a community and the like on the basis of a school, a matter of concern and the like. As social network services have recently become popular, a method, which enables a user to make more personal connections by recommending someone who the user may know based on information about a school, region, job, e-mail address and the like, has been widely used.

However, according to such a method of building the personal connections, even though the user finds a person he or she knew such as a long lost friend or a person in his or her hometown, since the finding of the person is only performed through the internet, they mainly exchange only a one-off greeting online, and it is actually very unusual that they continuously interact or have a meeting offline.

Meanwhile, modern society has a very high level of mobility. That is, many people pass each other by in a subway or in the street without sharing information on a name, job, residence, alma mater, concern and the like. As such, among the people who accidentally pass a user by, there may be a person in his or her hometown, a school friend, a person who has a common concern and the like.

Usually, when people encounter a villager in while traveling or encounter an alumni of their alma mater located far from their residence, they can feel delight, and according to circumstances, this accidental encounter can lead to a close relationship. However, even this accidental encounter is very rare because most people who bump into each other have no information about each other. Furthermore, there is a lesser possibility that people will meet their old friends as they accidentally pass them by, or an accidental encounter will lead to a close relationship.

DISCLOSURE

Technical Problem

Accordingly, the present invention has been made keeping in mind the above problems occurring in the prior art, and an object of the present invention is to provide a method for providing a location-based service for finding a person using a smart device, which enables a service provision server to receive location information from a first user terminal, to match a second user using the matching information received and registered from the first user terminal among other users located within a predetermined distance from a location of a first user, and to transmit the matching data to the first user terminal so that the second user corresponding to the matching information among other users at adjacent places can be found in real time and the first user can be connected with a person who he or she looks for by chance.

Another object of the present invention is to provide a method of providing a location-based service for finding a person using a smart device, which can find a person who a user looks for and can improve the user's satisfaction by transmitting matching data in a push message form to a first user terminal, enabling a first user to recognize existence of a second user immediately, and automatically correcting information as to whether or not to activate matching information according to location information.

Technical Solution

In order to accomplish the above objects, the present invention provides a method of providing a location-based service for finding a person using a smart device, which is carried out by a service provision server configured to provide the service for finding a person, the method including: (1) a step of receiving and registering matching information inputted from a first user terminal; (2) a step of receiving location information from the first user terminal; (3) a step of a second user using the matching information of a first user registered in step (1) among other users positioned within a predetermined distance from a location of the first user terminal received in step (2); and (4) a step of transmitting matching data resulting from matching performed in step (3) to the first user terminal.

Preferably, the matching information may include at least one kind of information among various kinds of information on a residence, hometown, alma mater, unit in which military services were performed, job, concerns and hobby.

Preferably, step (1) above may include: a step (1-1) of receiving the matching information inputted from the first user terminal; a step (1-2) of receiving information as to whether or not to activate the received matching information; and a step (1-3) of registering the activated matching information.

More preferably, in step (1-2) above, when the activated matching information is regional information, and the regional information is consistent with the location information received in step (2) above, the corresponding matching information may be inactivated.

Preferably, when the matching information registered in step (1) above is composed of various kinds of matching information, and in step (3) above, various kinds of the matching information of the first user and matching information of the second user meet a predetermined condition, matching may be performed.

More preferably, the predetermined condition may be a condition in which various kinds of matching information of the first user and matching information of the second user are completely consistent with each other, a condition in which they are consistent with each other in terms of at least one kind of matching information, or a condition in which they are consistent with each other in terms of a specific kind of matching information or other kinds of matching information.

Preferably, in step (4) above, the matching data may be transmitted in a push message form.

Preferably, the matching data may include at least one kind of information among various kinds of information, such as matching information of the second user matched in step (3) above, location information, a contact link, a distance between the first user and the second user, and a matching fact.

Preferably, the first user terminal may be a smart device in which an application program for implementing steps (1) to (4) above is installed.

Advantageous Effects

According to a method for providing a location-based service for finding a person using a smart device suggested in the present invention, the method can find a second user corresponding to matching information among other users at adjacent places in real time and can enable a first user to be connected with a person who he or she looks for by chance by enabling a service provision server to receive the location information from a first user terminal, to match the second user using the matching information received and registered from the first user terminal among other users located within the predetermined distance from the location of the first user, and to transmit the matched data to the first user terminal.

Also, according to the present invention, a first user is enabled to immediately recognize existence of a second user who is hard to meet and to respond thereto by transmitting matching data in a push message form to a first user terminal, and a person who he or she looks for can be found by automatically correcting information as to whether or not to activate matching information according to location information, thereby enabling the user's satisfaction to be improved.

DESCRIPTION OF THE REFERENCE NUMERALS IN THE DRAWINGS

Figure 1:
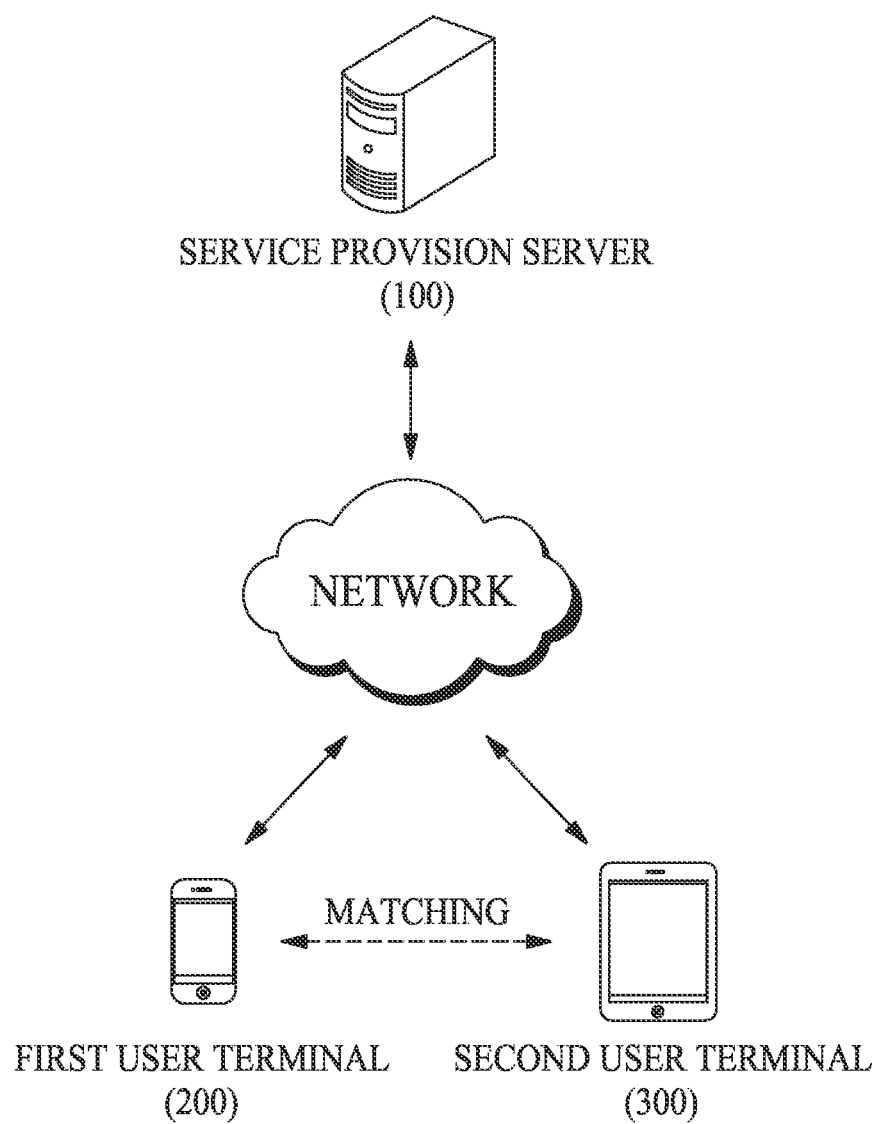
FIG. 1 is a block diagram illustrating a system for implementing a method of providing a location-based service for finding a person using a smart device according to an embodiment of the present invention.

100: Service provision server
200: First user terminal
300: Second user terminal

S100: Step of receiving and registering matching information inputted from a first user terminal
S110: Step of receiving matching information inputted from the first user terminal
S120: Step of receiving information as to whether or not to activate the matching information;
S130: Step of registering the activated matching information
S200: Step of receiving location information from the first user
S300: Step of matching a second user among users located within a predetermined distance from a location of the first user terminal
S400: Step of transmitting matching data to the first user terminal best mode Hereinbelow, preferred embodiments of the present invention will be described in detail with reference to the accompanying drawings in such a manner that the present invention could be easily implemented by those having ordinary skill in the art to which the present invention pertains. In the following description, it is to be noted that, when the functions of conventional elements and the detailed description of elements related with the present invention may make the gist of the present invention unclear, a detailed description of those elements will be omitted. Wherever possible, the same reference numerals will be used throughout the drawings and the description to refer to the same or like parts.

In addition, it will be understood that when an element is referred to as being "connected" or "coupled" to another element, it can be "directly connected or coupled" to the other element or it can be "indirectly connected or coupled" to the other element, namely, intervening elements may be present. Also, it will be understood that 'comprising' or "including" an element refers to that other elements can be further comprised or included rather than referring to that other elements are excluded unless the context clearly indicates otherwise.

FIG. 1 is a block diagram illustrating a system for implementing a method of providing a location-based service for finding a person using a smart device according to an embodiment of the present invention. As illustrated in FIG. 1, the system for implementing the method for providing the location-based service for finding a person using a smart device according to the embodiment of the present invention may include: a service provision server 100; a first user terminal 200; and a second user terminal 300.

That is, the present invention is intended to provide a service of matching a person from a hometown, alumni and the like of a user among other users in a subway, on the street, at a travel destination or the like and notifying a matching result through a smart device in a push message form or the like. More specifically, the service provision server 100 receives and registers matching information inputted from the first user terminal 200, receives location information, and matches a second user using the registered matching information among other users located within a predetermined distance, thereby transmitting matching data to the first user terminal 200. As such, by looking for the second user corresponding to the matching information among other users at adjacent places in real time through matching, the users can meet pleasant persons by chance and they can engage with each other. Furthermore, by notifying the matching result in a push message form, the first user can immediately recognize existence of the second user who may be hard to meet again. Hereinafter, the elements of the system for implementing the method of providing the location-based service for finding a person using a smart device according to the embodiment of the present invention will be described in detail.

The service provision server 100 allows the first user terminal 200 and the second user terminal 300 to access through a network including the internet, an intranet, a wired and wireless communication network, a mobile communication network and the like, and is a server for providing a service for finding a person so that the first user and the second user can find each other. The service provision server 100 allows a plurality of user terminals in addition to the first user terminal 200 and the second user terminal 300 to access and is able to transmit and receive various kinds of signals, data and the like. Meanwhile, the service provision server 100 may have a database so as to store and register user information and matching information of the first user and the second user.

The first user terminal 200 and the second user terminal 300 are user terminals intended to find an alumni, a neighbor, a hometown friend or the like of a user among other persons who pass adjacent places to the user using the location-based service for finding a person provided by the service provision server 100. The first user and the second user may register matching information into the service provision server 100 and may receive information that there is a matched person among other persons positioned at adjacent places or information on the matched person in a matching data form. Hereinafter, the method will be described on the basis of the first user terminal 200, and a user matched with the first user may be the second user. However, according to situations, the first user and the second user may be changed in any degree.

Meanwhile, each of the first user terminal 200 and the second user terminal 300 may be a smart device in which an application program for implementing the method for providing the location-based service for finding a person using a smart device according to the embodiment of the present invention is installed. The smart device is not limited with regard to the function thereof and refers to a product which enables a considerable portion of the function to be changed or to extend through an application program. The smart device may be a smart phone, a tablet PC and the like. The first user terminal 200 or the second user terminal 300 of the present invention are not limited to the form of the terminals as listed above. If a device may input and registers matching information by accessing to the service provision server 100 through a network and may receive matching data by providing location information, the device may sufficiently play a role of the first user terminal 200 or the second user terminal 300 of the present invention regardless of the detailed form of the terminal.

Figure 2:
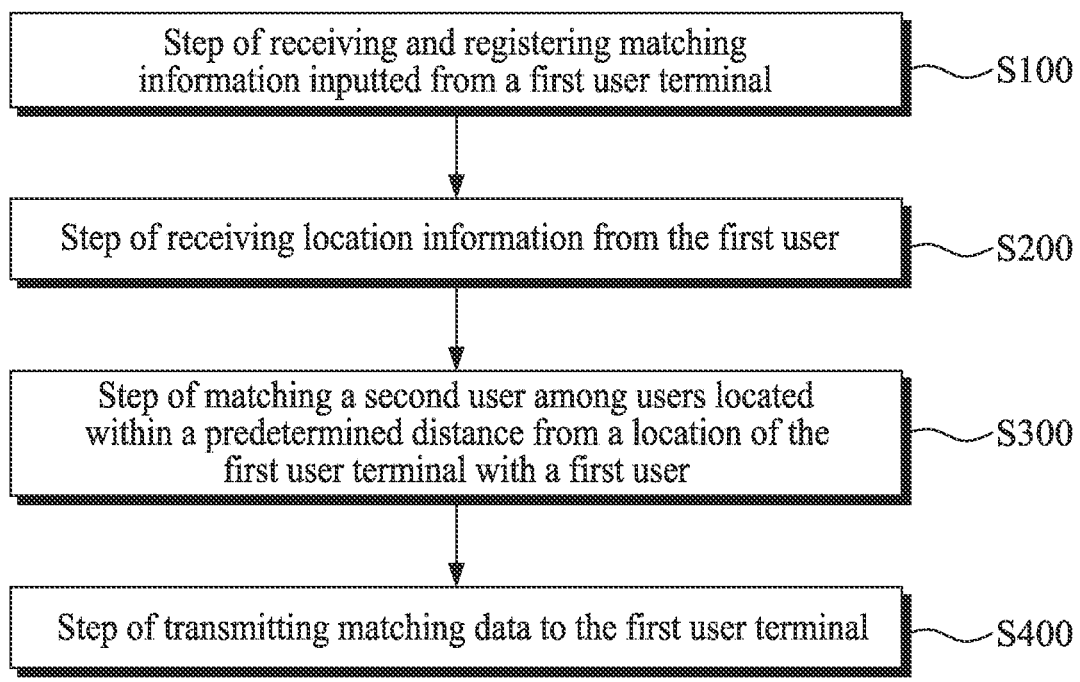
FIG. 2 is a flow chart illustrating the method for providing the location-based service for finding a person using a smart device according to the embodiment of the present invention.

FIG. 2 is a flow chart showing the method for providing the location-based service for finding a person using a smart device according to the embodiment of the present invention. As illustrated in FIG. 2, the method for providing a location-based service for finding a person using a smart device according to the embodiment of the present invention may include: a step of receiving and registering matching information inputted from the first user terminal 200 (S100); a step of receiving location information from the first user terminal 200 (S200); a step of matching the second user among other users positioned within a predetermined distance from a location of the first user terminal 200 (S300); and a step of transmitting matching data to the first user terminal 200 (S400).

In step S100, the service provision server 100 may receive and register the matching information inputted from the first user terminal 200. The matching information received in step S100 may specify the scope of persons whom the first user wants to find, may include at least one kind of information among various kinds of information on residence, hometown, alma mater, unit in which military services were performed, job, concerns and hobby and may further include information on an institute or school being attended by the first user, a club or café community he or she actively participates in and the like. In step S100, selection information as to whether or not the first user receives the matching data in a push message form in step S400 which will be described in detail later may be further received.

Figure 3:
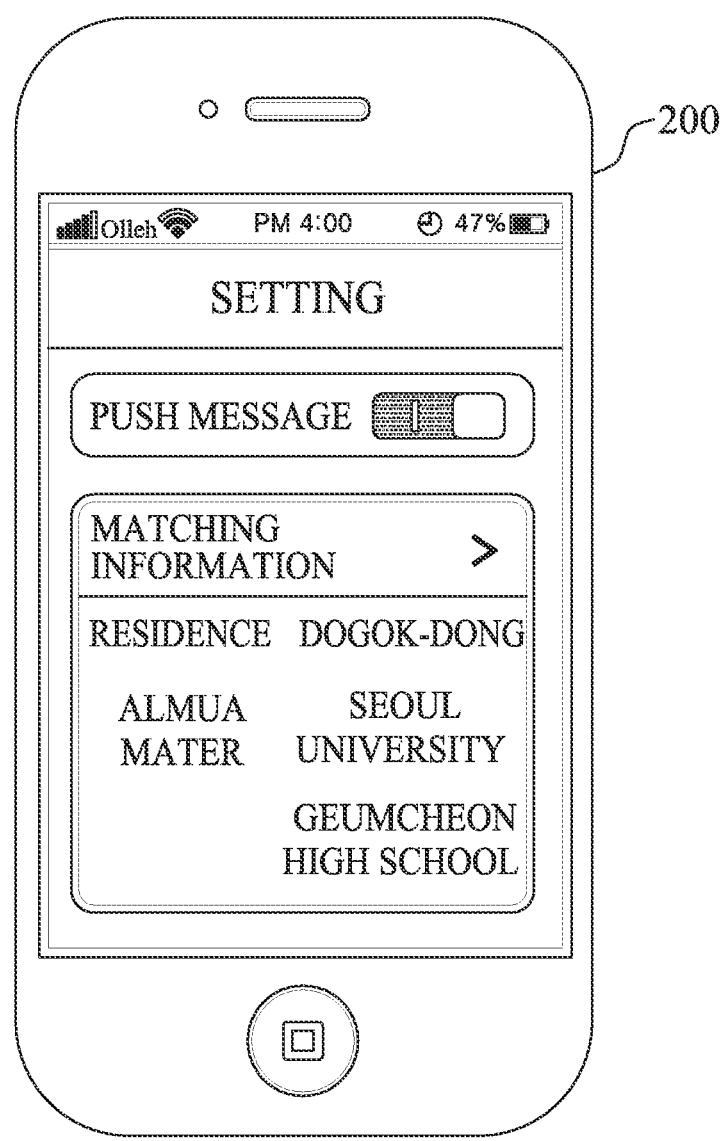
FIG. 3 is a view illustrating a first user terminal showing a state in which step S100 of the method for providing the location-based service for finding a person using a smart device according to the embodiment of the present invention is carried out.

FIG. 3 is a view illustrating the first user terminal 200 showing a state in which step S100 of the method for providing the location-based service for finding a person using a smart device according to the embodiment of the present invention is carried out. As illustrated in FIG. 3, in step S100 of the method for providing the location-based service for finding a person using a smart device according to the embodiment of the present invention, inputting of the matching information and the selection as to whether or not the first user receives the matching data in a push message form may be performed. Meanwhile, the received matching information and the registered matching information may not be consistent with each other, and in this case, only the registered matching information may be indicated. The detailed flow of step S100 will be described in detail later with reference to FIG. 5.

In step S200, the service provision server 100 may receive the location information from the first user terminal. Most smart devices which have been recently launched may enable users of the smart devices to use a location information service using a global positioning system (GPS), a mobile communication network or the like. Through such a location information service, the service provision server 100 may receive the location information of the first user terminal 200 in step S200. Of course, in step S200, the service provision server may also receive location information of other user terminals including the second user terminal 300.

In step S300, the service provision server 100 may match the second user using the matching information of the first user registered in step S100 among other users positioned within the predetermined distance from the location of the first user terminal 200 received in Step S200. Matching in step S300 may mean that the matching information of the first user and the matching information of the second user are entirely or partially consistent with each other, the matching may be carried out in consideration of a similar scope in addition to the complete same scope of the matching information. That is, among other users positioned at adjacent places to the first user, the second user whose matching information is entirely or partially consistent with the matching information of the first user and thus is matched with the first user can be found using the location information received from the first user terminal 200.

Meanwhile, the predetermined distance in step S300 may be received from the first user terminal 200 in step S100, but the predetermined distance may be also determined by an operator of the service provision server 100. When the predetermined distance is received from the first user terminal 200 in step S100, a single distance may be received, but different distances according to matching information may be received. Also, according to the location information of the first user terminal received in step S200, the distances may be set to be different from each other according to each region, and adjustment of the distances may be automatically performed by the service provision server 100.

Also, in step S300, when the matching information registered in step S100 is composed of various kinds of information, the various kinds of matching information of the first user and the matching information of the second user may be matched when they meet a predetermined condition. At this time, the predetermined condition may be a condition in which the matching information of the first user is completely consistent with that of the second user, a condition in which the matching information of the first user and the matching information of the second user are consistent with each other in terms of at least one kind of information, or a condition in which they are consistent with each other in terms of a specific kind of matching information or other kinds of matching information. For example, as illustrated in FIG. 3, when the matching information is composed of various kinds of information such as a residence (e.g. Dogok-dong) and an alumni or alumna (Seoul University, Geumcheon High school), the second user matched with the first user in step S300 may be a person who lives in Dogok-dong and is a graduate of Seoul University and Geumcheon High school, or may a person who lives in Dogok-dong. Also, in a case where the residence is needed to always coincide with the matching information, when a person who lives in Dogok-dong and is a graduate of Seoul University or a person who lives in Dogok-dong and is a graduate of Geumcheon High school exists at adjacent places to the first user, he or she may be the second user.

In step S400, the service provision server 100 may transmit the matching data resulting from matching in step S300 to the first user terminal 200. The matching data may include at least one kind of information among various kinds of information, such as the matching information of the second user resulting from matching in step S300, the location information, a contact link, a distance between the first user and the second user and a matching fact. In step S400, the matching data may be transmitted in a push message form, and the first user may confirm whether or not there is a person matched at adjacent places in real time because the matching data is transmitted in the push message form.

Figure 4:
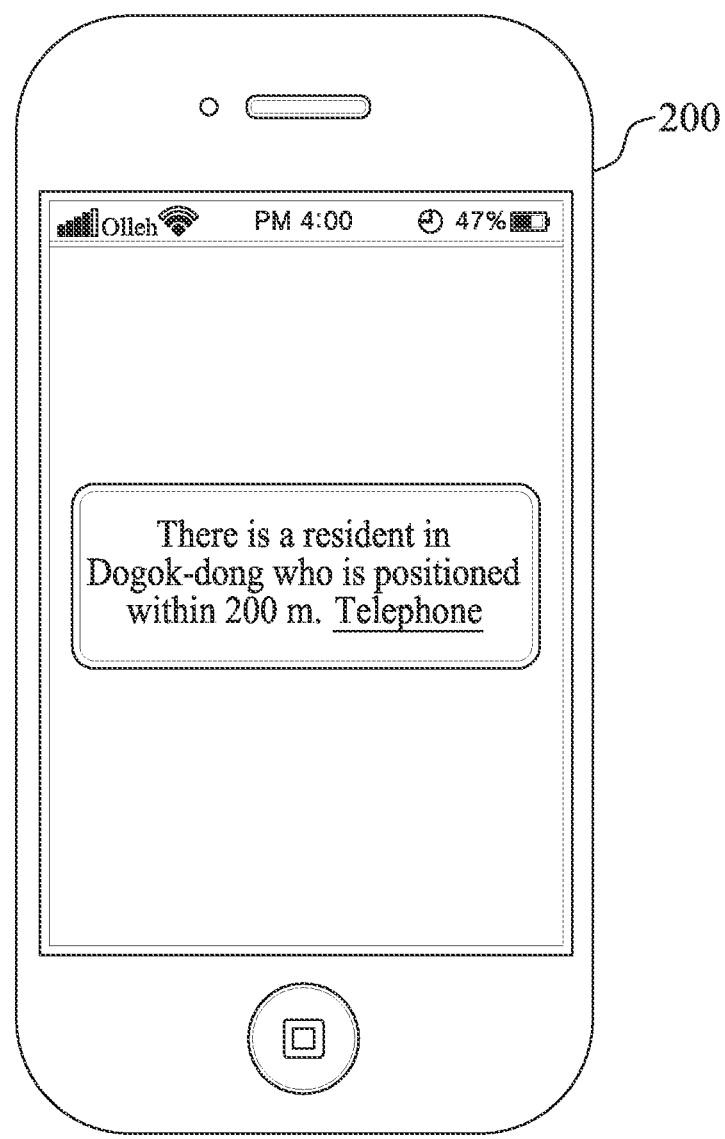
FIG. 4 is a view illustrating the first user terminal showing a state which step S400 of the method for providing the location-based service for finding a person using a smart device according to the embodiment of the present invention is carried out.

FIG. 4 is a view illustrating the first user terminal 200 showing a state in which step S400 of the method for providing the location-based service for finding a person using the smart device according to the embodiment of the present invention is carried out. As illustrated in FIG. 4, in step S400 of the method for providing the location-based service for finding a person using the smart device according to the embodiment of the present invention, the fact that the second user who he or she looks for is present at an adjacent place may be notified in the push message form. In FIG. 4, the matching data including the matching information (residence: Dogok-dong) of the second user, a distance (200 m) between the first user and the second user and a contact information (telephone number) is transmitted to the first user terminal 200 in the push message form. In particular, when the contact information is transmitted, as illustrated in FIG. 4, real contact information is not exposed to protect personal information of the second user, and a temporary number may be assigned or only an encoded link for contact may be transmitted. According to some embodiments, the corresponding service may be provided so that the users can contact with each other through text messages, chatting and the like in addition to a telephone means.

Figure 5:
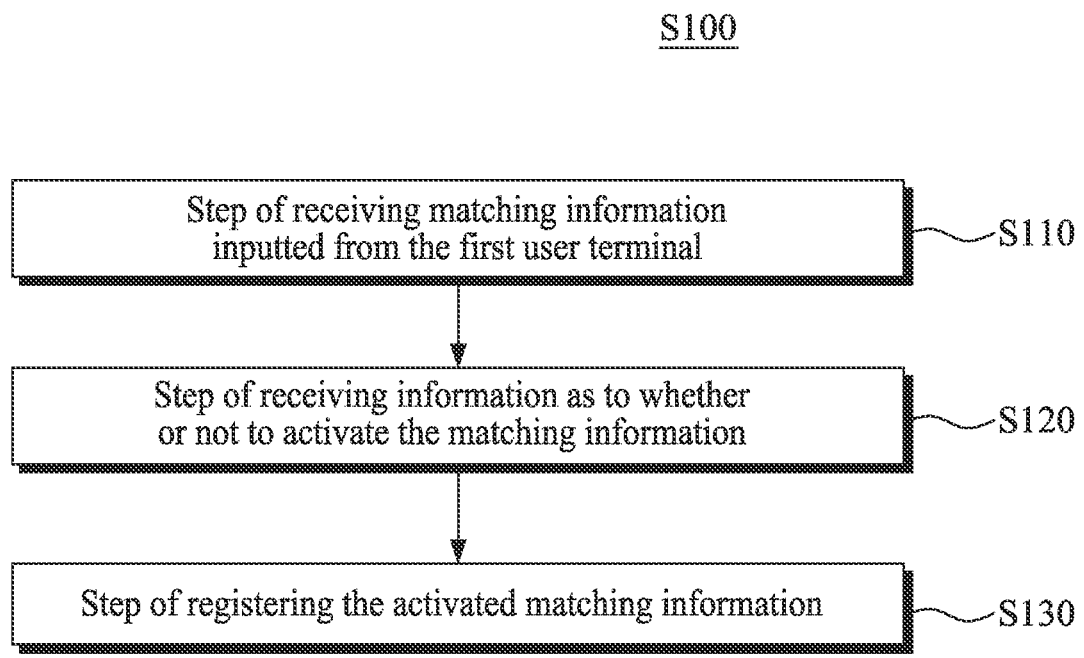
FIG. 5 is a detailed flow chart illustrating step S100 of the method for providing the location-based service for finding a person using a smart device according to the embodiment of the present invention.

FIG. 5 is a detailed flow chart showing step S100 of the method for providing the location-based service for finding a person using the smart device according to the embodiment of the present invention. As illustrated in FIG. 5, step S100 of the method for providing the location-based service for finding a person using the smart device according to the embodiment of the present invention may include: a step of receiving the matching information inputted from the first user terminal 200 (S110); a step of receiving information as to whether or not to activate the matching information (S120); and a step of registering the activated matching information (S130).

In step S110, the service provision server 100 may receive the matching information inputted from the first user terminal. The matching information received in step S110 may include at least one information among various kinds of information on a residence, hometown, alma mater, unit in which military services were performed, job, concerns and hobby of the first user. The matching information inputted in step S110 may be edited according to a request of the first user terminal 200, and when the matching information is information relating to a position or a region, an electronic map is provided so that the position or region can be selected on the electronic map.

Figure 6:
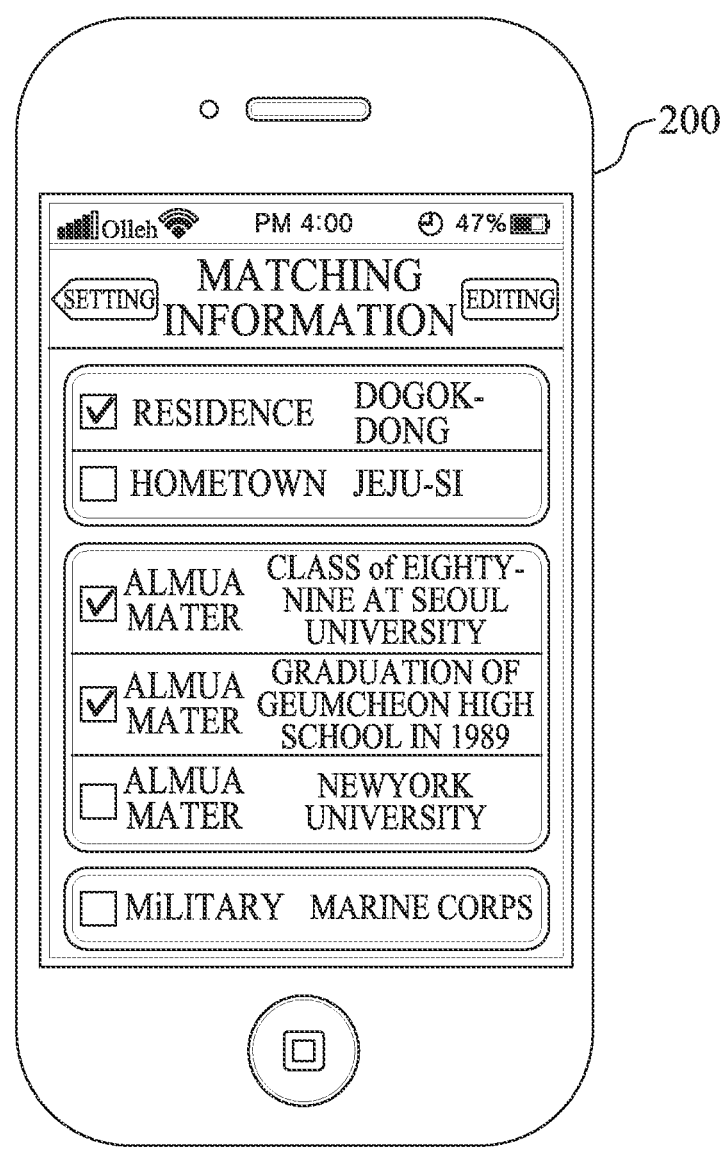
FIG. 6 is a view illustrating the first user terminal showing a state in which step S110 of the method for providing the location-based service for finding a person using a smart device according to the embodiment of the present invention is carried out.

FIG. 6 is a view illustrating the first user terminal 200 showing a state in which step S110 of the method for providing the location-based service for finding a person using the smart device according to the embodiment of the present invention is carried out. As illustrated in FIG. 6, in step S110 of the method for providing the location-based service for finding a person using the smart device according to the embodiment of the present invention, various kinds of matching information may be received from the first user terminal 200. When the matching information is regional information, the region is not necessarily needed to correspond to the same area or administrative district with that of the matching information, and according to the need, the region may be variously inputted in a unit of a country, city, district, town and the like. Also, when the matching information is information relating to an alma mater and the like, it may include information on an admission year and graduation year as well as the name of the school.

In step S120, the service provision server 100 may receive information as to whether or not to activate of received the matching information. At least one kind of matching information may be received in step S110, and when the matching information is composed of various kinds of matching information, all kinds of the matching information may not be activated. For example, as illustrated in FIG. 6, even though, as the matching information, the first user has inputted information on a residence, hometown, university, high school, university upon studying overseas, unit in which military services were performed and the like, only the information on the residence, university and high school may be activated. In step S300, the second user may be matched using the matching information activated in step S120, and the matching information which has not been activated in step S120 may not be used upon matching the second user in step S300 even though the user has inputted the matching information.

Meanwhile, in step S120, when the activated matching information is regional information, and the regional information is consistent with the location information received in step S200, the corresponding matching information may be inactivated. For example, as illustrated in FIG. 6, in a case where the first user is a resident of Dogok-dong in Seoul, when the first user is provided with a service for finding and notifying other residents of Dogok-dong on a journey in different regions, the first user will be pleased to be provided with such a service. However, when the first user is present in his or her home or around the home, it will be pointless to provide the service for finding other residents of Dogok-dong. Accordingly, in step S120, the service provision server 100 may automatically inactivate the corresponding matching information when matching information corresponding to regional information is consistent with the location information of the first user terminal 200, thereby enabling the user's convenience to be improved.

Figure 7:
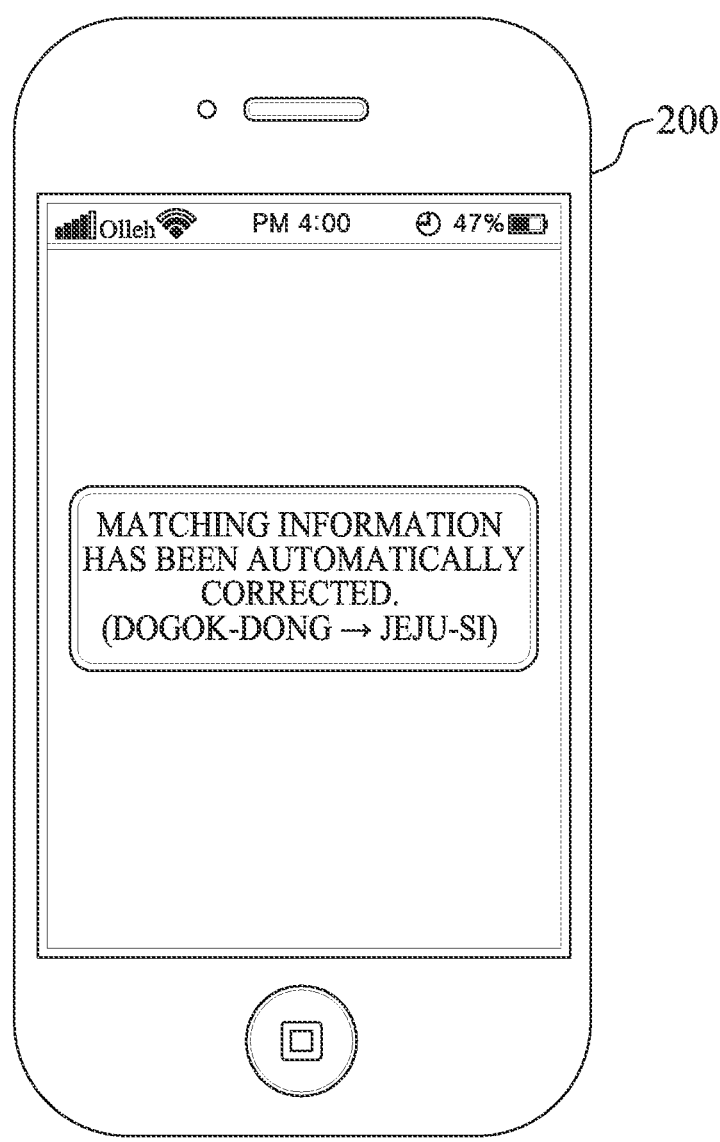
FIG. 7 is a view illustrating the first user terminal showing a state in which step S120 of the method for providing the location-based service for finding a person using a smart device according to the embodiment of the present invention is carried out.

FIG. 7 is a view illustrating the first user terminal 200 showing a state in which step S120 of the method for providing the location-based service for finding a person using the smart device according to the embodiment of the present invention is carried out. As illustrated in FIG. 7, in step S120 of the method for providing the location-based service for finding a person using the smart device according to the embodiment of the present invention, information as to whether or not to activate the matching information corresponding to regional information according to the location information received from the first user terminal 200 in step S200 may be automatically corrected, and the information may be notified in a push message form to the first user terminal 200. For example, as illustrated in FIGS. 6 and 7, the location information of the first user of two kinds of matching information corresponding to the regional information is consistent with Dogok-dong which is residence of the first user, the matching information corresponding to the residence is inactivated, and the matching information corresponding to Jeju-si which is a hometown of the first user is activated, thereby enabling the activated matching information to be transmitted in a push message form. Accordingly, the first user may check the correction for an activation state of the matching information in real time, and may directly correct the activation of the matching information when the correction for the activation of the matching information is not performed to be contrary to a desired opinion of the first user, the first user may again directly correct information on the activation of the matching information.

In step S130, the service provision server 100 may register the activated matching information. As the service provision server 100 has registered the matching information activated in step 120, in step S300, matching may be performed by utilizing the registered matching information. According to the correction for activation of the matching information performed by the first user terminal 200 or the service provision server 100, in step S130, matching information may be registered again.

Although the embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method of providing a location-based service for finding a person using a smart device, which is carried out by a service provision server configured to provide the service for finding a person, the method comprising:
    receiving and registering user information for matching inputted from a first user terminal;
    receiving an indication to activate the received user information;
    registering the activated user information;
    receiving location information of the first user terminal;
    matching a second user, using the registered user information of the first user, among users positioned within a predetermined distance from the received location of the first user terminal, the matching of the second user generating matching data;
    determining whether the user information is regional information and whether the received location information of the first user terminal indicates that the first user terminal is located in a region specified by the regional information; and
    when it is determined that user information is not regional information or that the received location information of the first user terminal does not indicate that the first user terminal is located in the region specified by the regional information,
    transmitting the matching data to the first user terminal,
    wherein the transmitting of the matching data comprises:
        sending to the second user an encoded link for contact, the encoded link configured to provide communication between the second user and the first user without revealing real contact information of the first user to the second user; and
    when it is determined that the user information is regional information, and the regional information is consistent with the received location information of the first user terminal, inactivating the corresponding user information.

2. The method of claim 1, wherein the user information comprises at least one kind of information among various kinds of information on a residence, hometown, alma mater, unit in which military services were performed, job, concerns and hobby.

3. The method of claim 1, wherein when the register user information is composed of various kinds of user information, and when the various kinds of user information of the first user and user information of the second user meet a predetermined condition, matching is performed.

4. The method of claim 3, wherein the predetermined condition is at least one of: a condition in which various kinds of user information of the first user and user information of the second user are completely consistent with each other, a condition in which they are consistent with each other in terms of at least one kind of user information, and a condition in which they are consistent with each other in terms of a specific kind of user information.

5. The method of claim 1, wherein the matching data is transmitted in a push message form.

6. The method of claim 1, wherein the matching data comprises at least one of:
    user information of the second user, location information, a contact link, a distance between the first user and the second user, and a matching fact.

7. The method of claim 1, wherein the first user terminal is a smart device in which an application program for implementing the method is installed.

* * * * *